(12) United States Patent
Chen et al.

(10) Patent No.: US 7,384,102 B2
(45) Date of Patent: Jun. 10, 2008

(54) ARMREST DEVICE

(75) Inventors: Shun-Min Chen, Taipei (TW); Jian-Qun Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 88 days.

(21) Appl. No.: 11/344,141

(22) Filed: Feb. 1, 2006

(65) Prior Publication Data

US 2007/0085404 A1   Apr. 19, 2007

(30) Foreign Application Priority Data

Oct. 17, 2005   (CN) .................. 2005 2 0129285 U

(51) Int. Cl.
*A47C 7/54*   (2006.01)
(52) U.S. Cl. ................ 297/411.32; 297/250.1
(58) Field of Classification Search ............ 297/41.32, 297/250.1, 411.32, 411.38
See application file for complete search history.

(56) References Cited

U.S. PATENT DOCUMENTS

| | | | | |
|---|---|---|---|---|
| 4,496,190 A * | 1/1985 | Barley | .................... | 297/411.38 |
| 4,634,177 A * | 1/1987 | Meeker | .................. | 297/256.13 |
| 5,244,292 A * | 9/1993 | Wise | ........................ | 297/183.3 |
| 5,984,416 A * | 11/1999 | Waldo et al. | ........... | 297/411.38 |
| 6,145,927 A * | 11/2000 | Lo | ............................ | 297/250.1 |
| 6,467,847 B2 * | 10/2002 | Bidare | .................... | 297/411.32 |
| 6,682,143 B2 | 1/2004 | Amirault | | |
| 6,698,838 B2 | 3/2004 | Kain | | |
| 6,715,828 B1 * | 4/2004 | Cheng | ..................... | 297/183.3 |
| 6,752,462 B1 | 6/2004 | Kain et al. | | |
| 6,908,151 B2 * | 6/2005 | Meeker et al. | ........... | 297/250.1 |
| 2001/0000638 A1 * | 5/2001 | Kassai et al. | ............ | 297/250.1 |

* cited by examiner

*Primary Examiner*—Peter R. Brown
(74) *Attorney, Agent, or Firm*—Pillsbury Winthrop Shaw Pittman, LLP

(57) ABSTRACT

An armrest device includes an armrest mount, an armrest member, and a locking unit. The armrest mount and the armrest member are respectively formed with pivotally interconnected first and second pivot connecting portions such that the armrest member is pivotable relative to the armrest mount between first and second positions. The locking unit is mounted operably in the second pivot connecting portion, and includes a press member accessible externally of the second pivot connecting portion, and a locking tab unit projecting from the press member. The press member is operable to move from a locking position, where the locking tab unit engages the first pivot connecting portion to arrest pivoting movement of the armrest member, to an unlocking position, where the locking tab unit is disengaged from the first pivot connecting portion to permit pivoting movement of the armrest member between the first and second positions.

17 Claims, 7 Drawing Sheets

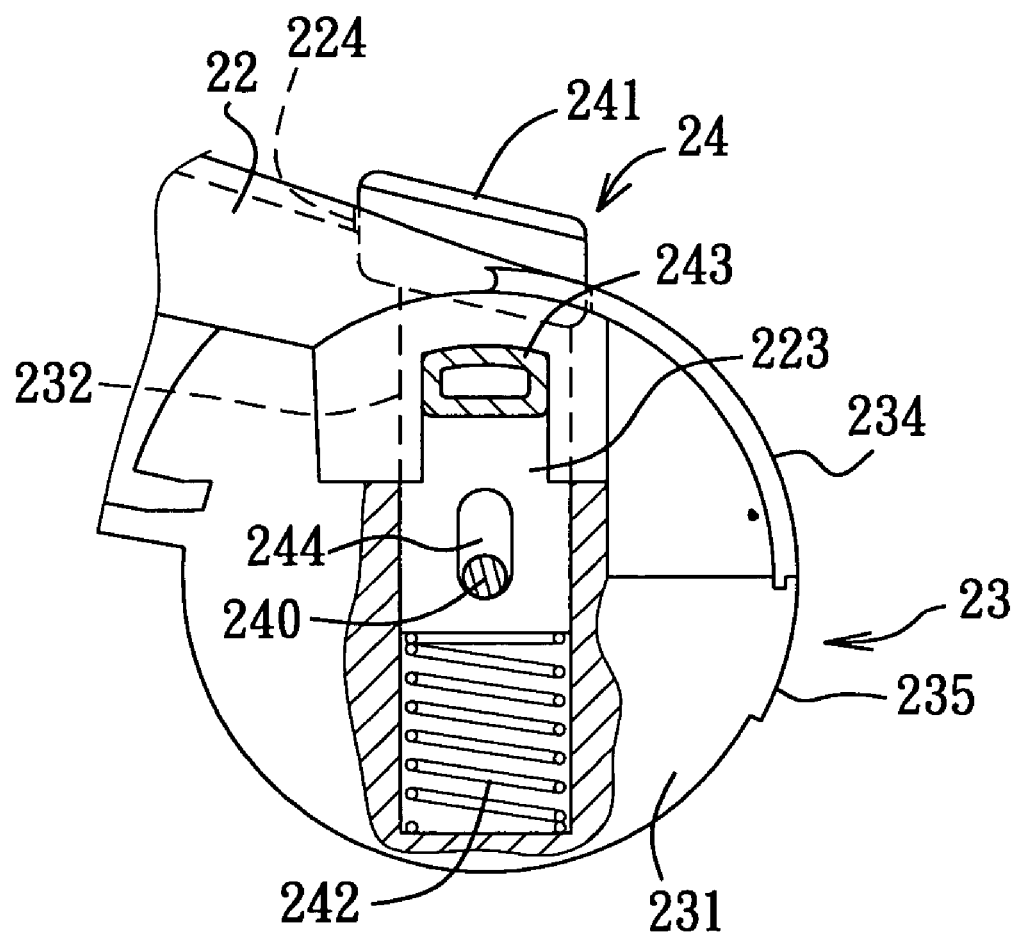
F I G. 5

ARMREST DEVICE

CROSS-REFERENCE TO RELATED APPLICATION

This application claims priority of Chinese application no. 200520129285.5, filed on Oct. 17, 2005.

BACKGROUND OF THE INVENTION

1. Field of the Invention

The invention relates to an armrest device, more particularly to an armrest device for a juvenile safety seat.

2. Description of the Related Art

Juvenile safety seats are commonly installed in vehicles to ensure safety of children seated therein. A conventional armrest device of a juvenile safety seat includes a pair of armrest mounts that are disposed respectively on two lateral sides of a seat body of the safety seat, and a pair of armrest members, each of which is mounted on a respective one of the armrest mounts. U.S. Pat. Nos. 6,682,143, 6,698,838, and 6,752,462 disclose conventional armrest devices that include an armrest member connected pivotally to an armrest mount so as to facilitate movement of a child into and out of a safety seat.

SUMMARY OF THE INVENTION

The object of the present invention is to provide a simple and easy-to-operate armrest device for a safety seat.

Another object of this invention is to provide an armrest device including a locking unit with a press member that can be accessed from a top side of an armrest member, thereby facilitating unlocking of the locking unit.

According to one aspect of the present invention, there is provided an armrest device that comprises an armrest mount, an armrest member, and a locking unit. The armrest mount is formed with a first pivot connecting portion. The armrest member is formed with a second pivot connecting portion that is connected pivotally to the first pivot connecting portion such that the armrest member is pivotable relative to the armrest mount between first and second positions. The locking unit is mounted operably in the second pivot connecting portion, and includes a press member that is accessible externally of the second pivot connecting portion, and a locking tab unit that projects from the press member. The press member is operable to move from a locking position, where the locking tab unit engages the first pivot connecting portion to arrest pivoting movement of the armrest member, to an unlocking position, where the locking tab unit is disengaged from the first pivot connecting portion so as to permit pivoting movement of the armrest member between the first and second positions.

Preferably, the second pivot connecting portion has a top wall formed with a top opening, and the press member protrudes outwardly of the second pivot connecting portion via the top opening.

According to another aspect of the present invention, there is provided an armrest device that comprises an armrest mount, an armrest member, and a locking unit. The armrest mount is formed with a first pivot connecting portion. The first pivot connecting portion is formed with an arcuate slide slot that is configured with a latching notch. The armrest member is formed with a second pivot connecting portion that is pivoted to the first pivot connecting portion such that the armrest member is pivotable relative to the armrest mount. The locking unit is mounted operably in the second pivot connecting portion, and includes a press member that is accessible externally of the second pivot connecting portion, and a locking tab that projects from the press member and that extends into the slide slot in the first pivot connecting portion. The press member is operable to move from a locking position, where the locking tab extends into the latching notch to engage the first pivot connecting portion and to arrest pivoting movement of the armrest member, to an unlocking position, where the locking tab is moved out of the latching notch so as to disengage the first pivot connecting portion and permit pivoting movement of the armrest member relative to the armrest mount.

BRIEF DESCRIPTION OF THE DRAWINGS

Other features and advantages of the present invention will become apparent in the following detailed description of the preferred embodiment with reference to the accompanying drawings, of which:

FIG. 5 is a fragmentary, partly sectional, schematic side view to illustrate a locking unit mounted in a pivot connecting portion of the armrest member;

DETAILED DESCRIPTION OF THE PREFERRED EMBODIMENT

Figure 1:
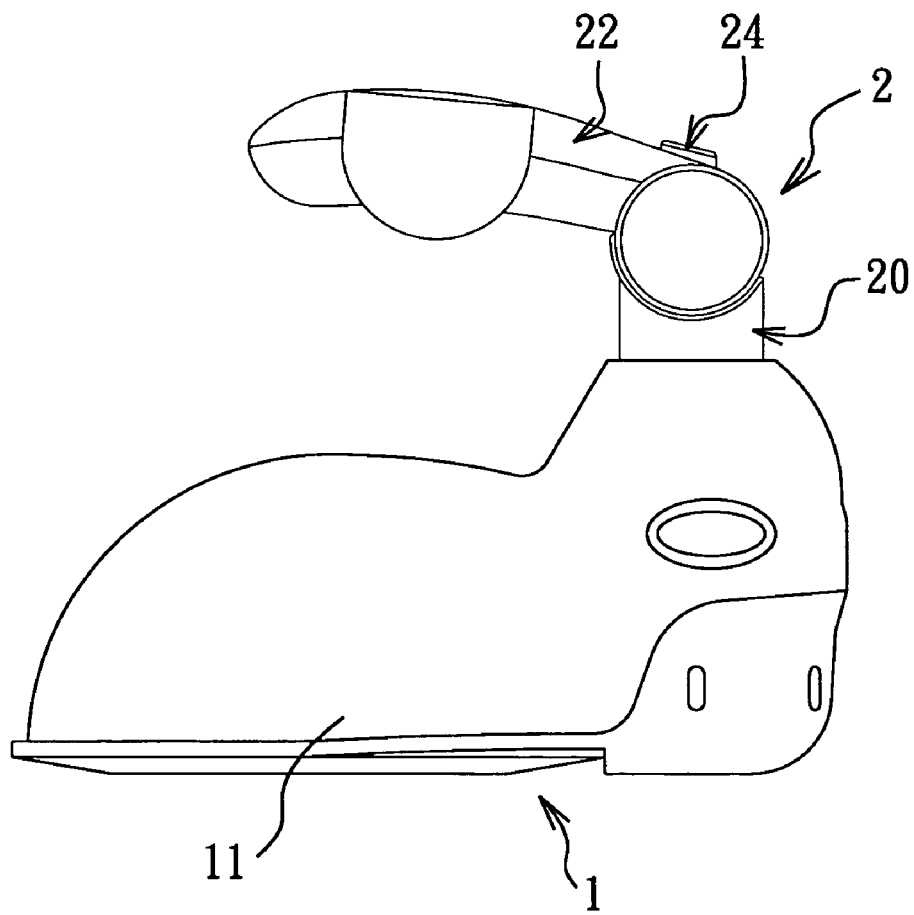
FIG. 1 is a schematic side view of a juvenile safety seat that incorporates the preferred embodiment of an armrest device according to the present invention.

Referring to FIGS. 1 to 6, the preferred embodiment of an armrest device 2 according to the present invention is shown to be adapted for application to a juvenile safety seat 1. The juvenile safety seat 1 includes a seat body 11 that has two lateral sides (only one is visible in FIG. 1), each of which is mounted with the armrest device 2 of this invention.

The armrest device 2 includes an armrest mount 20, an armrest member 22, a locking unit 24, and a pair of cover caps 3.

Figure 2:
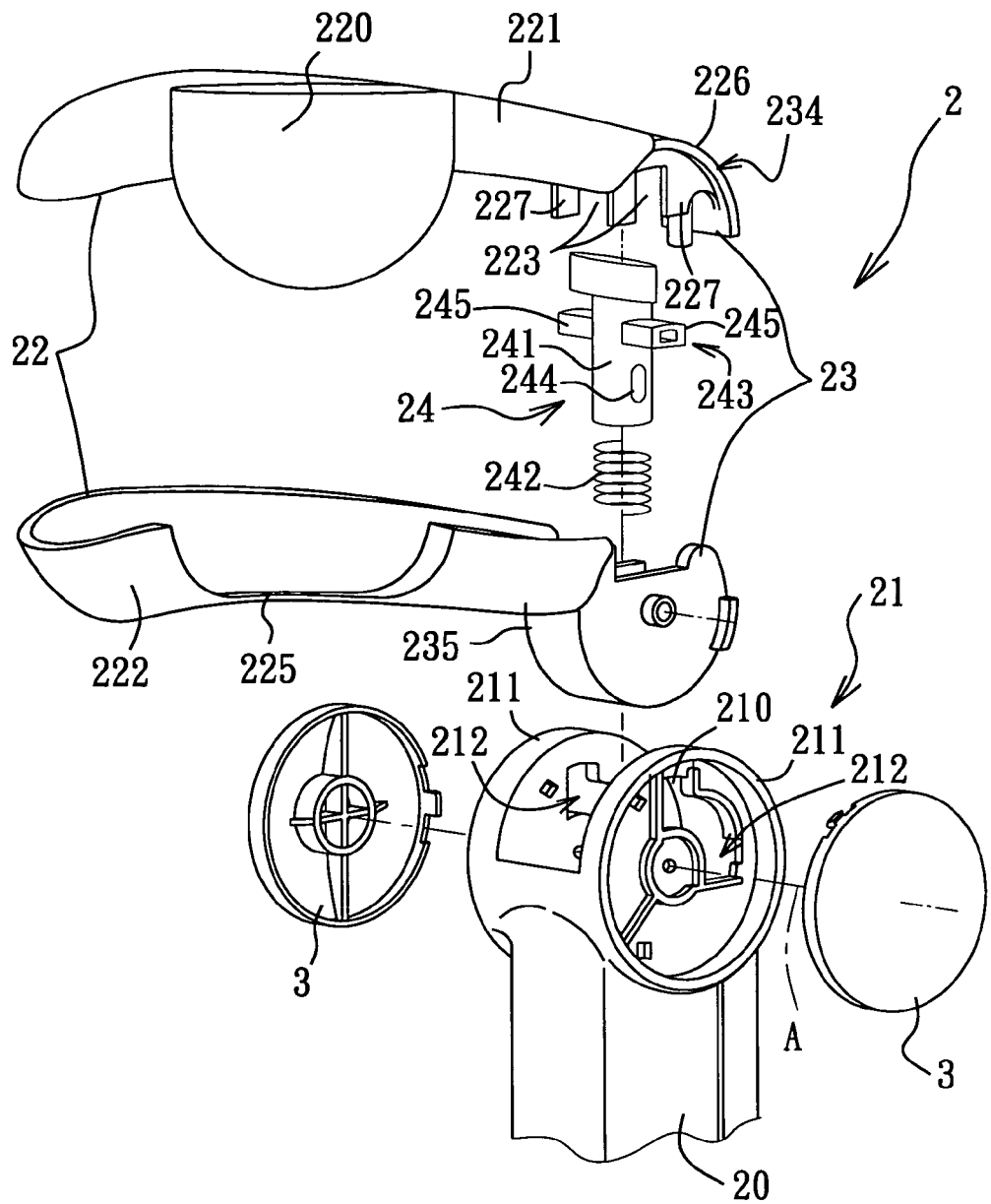
FIG. 2 is an exploded perspective view of the preferred embodiment.
Figure 3:
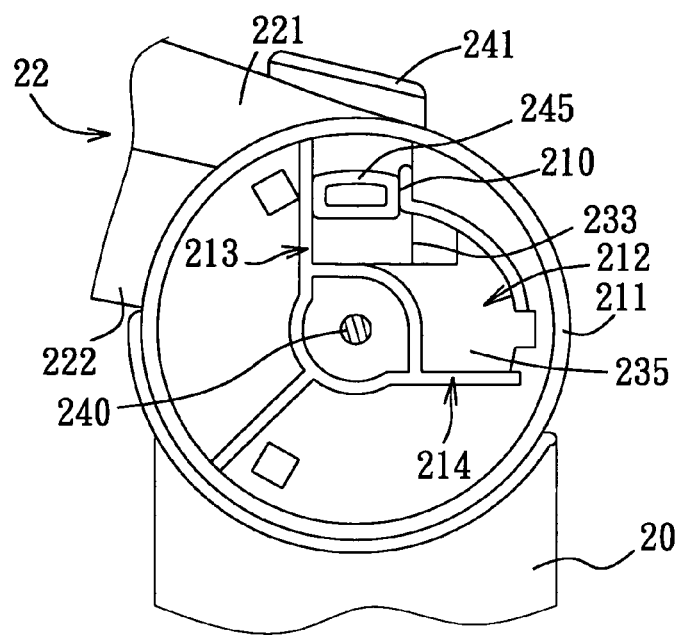
FIG. 3 is a schematic side view of the preferred embodiment with a cover cap thereof removed.

The armrest mount 20 has a lower end to be fixed to one of the lateral sides of the seat body 11, and an upper end formed with a first pivot connecting portion 21. As best shown in FIGS. 2 and 3, the first pivot connecting portion 21 includes a pair of spaced apart confining walls 211 that are generally circular in shape. Each of the confining walls 211 is formed with an arcuate slide slot 212. The slide slot 212 has a front slot end 213 and a rear slot end 214, and is configured with a latching notch 210 adjacent to the front slot end 213.

Figure 4:
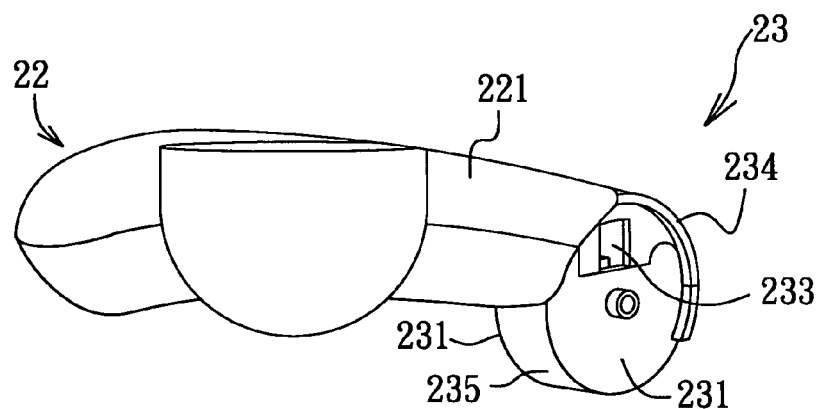
FIG. 4 is an assembled perspective view to illustrate an armrest member of the preferred embodiment.
Figure 7:
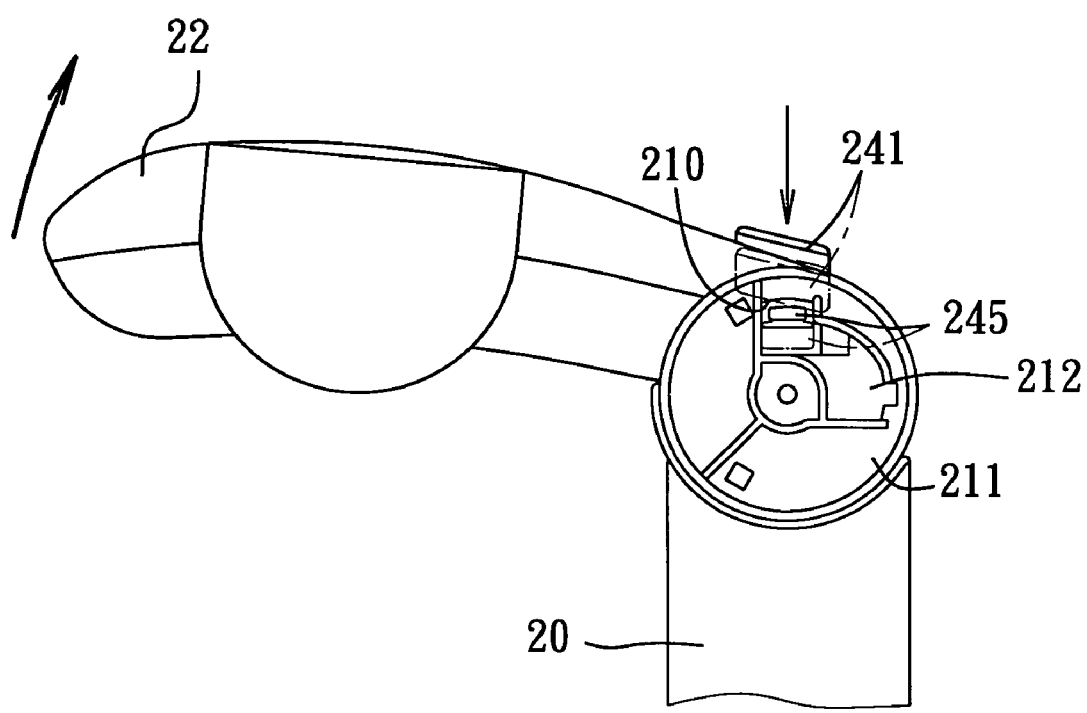
FIG. 7 is a schematic side view of the preferred embodiment, illustrating the armrest member when disposed at a first (lowered) position.
Figure 8:
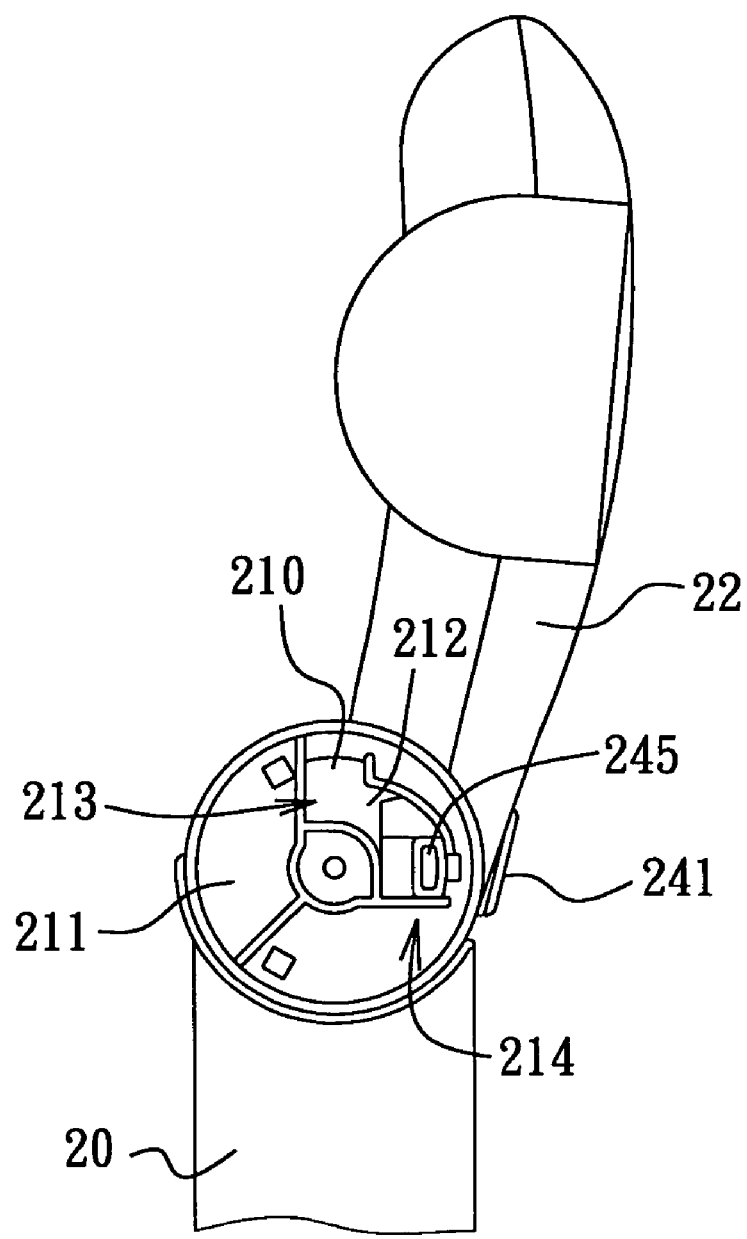
FIG. 8 is a schematic side view of the preferred embodiment, illustrating the armrest member when disposed at a second (raised) position.

As best shown in FIGS. 2, 4 and 5, the armrest member 22 has a rear end formed with a cylinder-shaped second pivot connecting portion 23 that is disposed between and that is pivoted to the confining walls 211 of the first pivot connecting portion 21 such that the armrest member 22 is pivotable relative to the armrest mount 20 about a pivot axis (A) between first and second positions (see FIGS. 7 and 8).

In this embodiment, the slide slots 212 in the confining walls 211 have a curvature center at the pivot axis (A). The range of rotation of the armrest member 22 relative to the armrest mount 20 is limited by the angle formed between the front and rear slot ends 213, 214 of the slide slots 212. In this embodiment, the front and rear slot ends 213, 214 of each slide slot 212 form a 90-degree angle therebetween. Preferably, each slide slot 212 is formed in the upper right quadrant of the corresponding confining wall 211, as best shown in FIGS. 2 and 3. In addition, each latching notch 210 extends in a radial outward direction relative to the pivot axis (A).

Each of the cover caps 3 serves to cover an outer surface of a respective one of the confining walls 211.

Referring again to FIGS. 4 and 5, the second pivot connecting portion 23 is formed with an elongate compartment 232, and includes a pair of spaced apart compartment walls 231 that have the compartment 232 disposed therebetween. Each of the compartment walls 231 is formed with a wall opening 233 that is in spatial communication with the compartment 232.

Referring back to FIG. 2, the armrest member 22 includes an upper shell part 221, and a lower shell part 222 connected to the upper shell part 221. The upper shell part 221 has a hollow rear segment 234 that opens downwardly. The lower shell part 222 has a hollow rear segment 235 that opens upwardly. The rear segments 234, 235 of the upper and lower shell parts 221, 222 cooperate to define the second pivot connecting portion 23, and cooperate to confine the compartment 232 (see FIG. 5). The rear segment 234 of the upper shell part 221 has a curved top wall 226 and a pair of side walls 227 that extend from opposite lateral edges of the curved top wall 226. The side walls 227 are formed with notches 223, which result in the wall openings 233 when the lower shell part 222 is connected to the upper shell part 221. In this embodiment, one side of the upper shell part 221 is provided with a container 220 that opens upwardly. The container 220 is a cup holder in this embodiment. The lower shell part 222 is formed with a notch 225 that mates with the container 220 when the lower shell part 222 is connected to the upper shell part 221.

Figure 6:
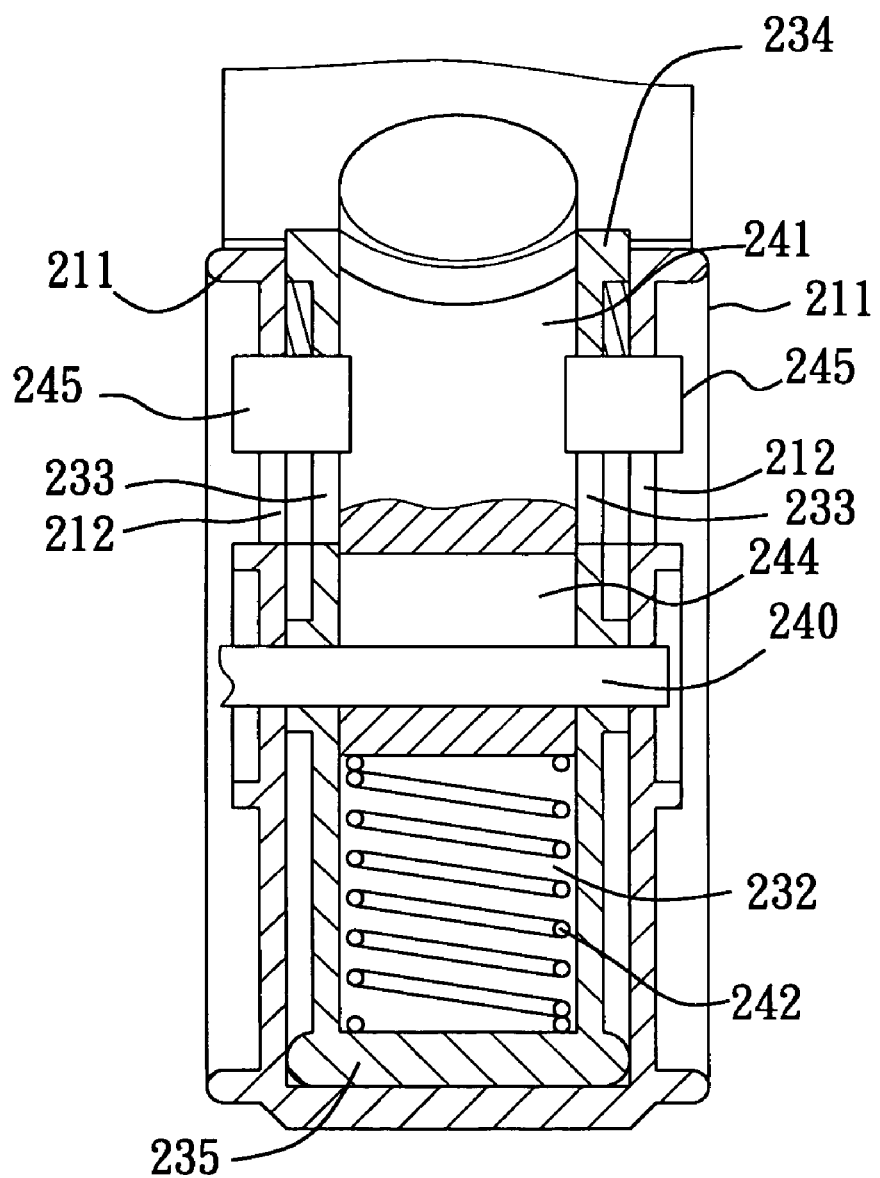
FIG. 6 is a fragmentary, partly sectional, schematic view of the preferred embodiment, illustrating a locking position of a press member of the locking unit.

Referring to FIGS. 3, 5 and 6, the locking unit 24 is mounted operably in the second pivot connecting portion 23, and includes a press member 241 that is accessible externally of the second pivot connecting portion 23, and a locking tab unit 243 that projects from the press member 241. The press member 241 is movably received in the compartment 232. Preferably, the second pivot connecting portion 23 is formed with a top opening 224 in the curved top wall 226 of the rear segment 234 of the upper shell part 221 of the armrest member 22 to enable the press member 241 to protrude outwardly of the compartment 232. The locking tab unit 243 includes a pair of locking tabs 245 that project respectively from opposite sides of the press member 241, that project respectively through the wall openings 233 in the compartment walls 231, and that extend respectively into the slide slots 212 in the confining walls 211. The press member 241 is formed with an elongated through slot 244 therethrough. A pivot axle 240 extends through the through slot 244 to interconnect pivotally the first and second pivot connecting portions 21, 23. The range of movement of the press member 241 in the compartment 232 is thus limited by the pivot axle 240. The locking unit 24 further includes a biasing member 242 that is disposed in the compartment 232 and that is a compression spring in this embodiment.

Each wall opening 233 is in spatial communication with the latching notch 210 in the adjacent one of the confining walls 211 when the armrest member 22 is at the first position, which is a lowered position relative to the armrest mount 20, as best shown in FIGS. 5, 6 and 7. The press member 241 is operable to move from a locking position to an unlocking position when the armrest member 22 is at the first position. At the locking position, the biasing member 242 biases the press member 241 upward such that the pivot axle 240 is at a lower end of the through slot 244 and such that the locking tabs 245 of the locking tab unit 243 extend into the latching notches 210 in the confining walls 211 of the first pivot connecting portion 21 to engage the first pivot connecting portion 21 and to arrest pivoting movement of the armrest member 22 relative to the armrest mount 20. At the unlocking position, upon pressing the press member 241 to move the pivot axle 240 into an upper end of the through slot 244, the locking tabs 245 of the locking tab unit 243 are moved out of the latching notches 210 in the confining walls 211 of the first pivot connecting portion 21 so as to disengage the first pivot connecting portion 21 and permit pivoting movement of the armrest member 22 between the first and second positions. When the locking tabs 245 of the locking tab unit 243 are moved out of the latching notches 210, and the armrest member 22 is pivoted from the first position to the second position, the locking tabs 245 move along the slide slots 212 until the locking tabs 245 abut against the rear slot ends 214 of the slide slots 212, thereby limiting further pivoting movement of the armrest member 22. At the second position, the armrest member 22 is raised relative to the armrest mount 20, as best shown in FIG. 8.

In sum, the armrest mount 20 and the armrest member 22 of the armrest device of this invention are respectively formed with pivotally interconnected first and second pivot connecting portions 21, 23 such that the armrest member 22 is pivotable relative to the armrest mount 20 between first and second positions. The locking unit 24 includes the press member 241 accessible externally of the second pivot connecting portion 23, and the locking tab unit 243 projecting from the press member 241. The locking tab unit 243 engages the latching notches 210 in the first pivot connecting portion 21 to arrest pivoting movement of the armrest member 22 at the first (lowered) position. By simply pressing the press member 241, the locking tab unit 243 is disengaged from the first pivot connecting portion 21 to permit pivoting movement of the armrest member 22 from the first position to the second (raised) position. Movement of a child into and out of the safety seat 1 is facilitated when the armrest member 22 is at the second (raised) position.

In this embodiment, there is no need to operate the press member 241 when moving the armrest member 22 from the second position back to the first position. In other embodiments of this invention, each slide slot 212 may be configured with two latching notches 210 respectively adjacent to the front and rear slot ends 213, 214. In such embodiments, the locking unit 24 can retain releasably the armrest member 22 at the first and second positions.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An armrest device comprising:
an armrest mount formed with a first pivot connecting portion;
an armrest member formed with a second pivot connecting portion that is connected pivotally to said first pivot connecting portion such that said armrest member is pivotable relative to said armrest mount between first and second positions; and
a locking unit mounted operably in said second pivot connecting portion, and including a press member that is accessible externally of said second pivot connecting portion, and a locking tab unit that projects from said press member;
wherein said press member is operable to move from a locking position, where said locking tab unit engages said first pivot connecting portion to arrest pivoting movement of said armrest member, to an unlocking position, where said locking tab unit is disengaged from said first pivot connecting portion so as to permit pivoting movement of said armrest member between the first and second positions;
said first pivot connecting portion including a pair of spaced apart confining walls;
said second pivot connecting portion being disposed between and being pivoted to said confining walls of said first pivot connecting portion;
said second pivot connecting portion being formed with a compartment for movably receiving said press member, and including a pair of spaced apart compartment walls that have said compartment disposed therebetween, each of said compartment walls being formed with a wall opening that is in spatial communication with said compartment;
each of said confining walls being formed with an arcuate slide slot that is in spatial communication with said wall opening in an adjacent one of said compartment walls;
said locking tab unit including a pair of locking tabs that project respectively from opposite sides of said press member, that project respectively through said wall openings in said compartment walls, and that extend respectively into said slide slots in said confining walls.

2. The armrest device as claimed in claim 1, wherein said second pivot connecting portion has a top wall formed with a top opening, and said press member protrudes outwardly of said second pivot connecting portion via said top opening.

3. The armrest device as claimed in claim 1, wherein:
said locking unit further includes a biasing member that is disposed in said compartment and that biases said press member to the locking position;
said second pivot connecting portion being further formed with a top opening to enable said press member to protrude outwardly of said compartment.

4. The armrest device as claimed in claim 3, wherein said armrest member includes an upper shell part and a lower shell part connected to said upper shell part, said upper shell part having a hollow rear segment that opens downwardly, said lower shell part having a hollow rear segment that opens upwardly, said rear segments of said upper and lower shell parts cooperating to define said second pivot connecting portion, and cooperating to confine said compartment.

5. The armrest device as claimed in claim 4, wherein said rear segment of said upper shell part has a curved top wall and a pair of side walls that extend from opposite lateral edges of said curved top wall and that are formed with said wall openings, respectively.

6. The armrest device as claimed in claim 1, wherein:
said armrest member is pivotable relative to said armrest mount about a pivot axis;
said slide slots in said confining walls having a curvature center at the pivot axis;
each of said slide slots having a front slot end and a rear slot end, and being configured with a latching notch adjacent to said front slot end, said latching notch extending in a radial outward direction relative to the pivot axis;
each of said wall openings in said compartment walls being in spatial communication with said latching notch in the adjacent one of said confining walls when said armrest member is at the first position;
said locking tabs respectively extending into said latching notches when said press member is at the locking position.

7. The armrest device as claimed in claim 1, wherein said armrest member includes an upper shell part and a lower shell part connected to said upper shell part, said upper shell part having a hollow rear segment that opens downwardly, said lower shell part having a hollow rear segment that opens upwardly, said rear segments of said upper and lower shell parts cooperating to define said second pivot connecting portion, and cooperating to confine said compartment.

8. The armrest device as claimed in claim 1, wherein said press member is formed with an elongated through slot therethrough, said armrest device further comprising a pivot axle extending through said through slot to interconnect pivotally said first and second pivot connecting portions.

9. The armrest device as claimed in claim 1, further comprising a pair of cover caps, each of which covers an outer surface of a respective one of said confining walls.

10. The armrest device as claimed in claim 1, wherein:
said locking unit retains releasably said armrest member at the first position;
said armrest member being lowered relative to said armrest mount when at the first position, and being raised relative to said armrest mount when at the second position.

11. An armrest device comprising:
an armrest mount formed with a first pivot connecting portion, said first pivot connecting portion being formed with an arcuate slide slot that is configured with a latching notch;
an armrest member formed with a second pivot connecting portion that is pivoted to said first pivot connecting portion such that said armrest member is pivotable relative to said armrest mount; and
a locking unit mounted operably in said second pivot connecting portion, and including a press member that is accessible externally of said second pivot connecting portion, and a locking tab that projects from said press member and that extends into said slide slot in said first pivot connecting portion;
wherein said press member is operable to move from a locking position, where said locking tab extends into said latching notch to engage said first pivot connecting portion and arrest pivoting movement of said armrest member, to an unlocking position, where said locking tab is moved out of said latching notch so as to disengage said first pivot connecting portion and permit pivoting movement of said armrest member relative to said armrest mount;
said second pivot connecting portion being formed with a compartment for movably receiving said press member, and including a pair of spaced apart compartment walls that have said compartment disposed therebetween, one of said compartment walls being formed with a wall opening that is in spatial communication with said compartment;

said locking tab projecting from said press member, through said wall opening in said one of said compartment walls, and into said slide slot in said first pivot connecting portion.

12. The armrest device as claimed in claim 11, wherein said second pivot connecting portion has a top wall formed with a top opening, and said press member protrudes outwardly of said second pivot connecting portion via said top opening.

13. The armrest device as claimed in claim 11, wherein:
said armrest member is pivotable relative to said armrest mount about a pivot axis;
said slide slot having a curvature center at the pivot axis, a front slot end and a rear slot end, and being configured with said latching notch adjacent to one of said front and rear slot ends, said latching notch extending in a radial outward direction relative to the pivot axis.

14. The armrest device as claimed in claim 11, wherein said armrest member includes an upper shell part and a lower shell part connected to said upper shell part, said upper shell part having a hollow rear segment that opens downwardly, said lower shell part having a hollow rear segment that opens upwardly, said rear segments of said upper and lower shell parts cooperating to define said second pivot connecting portion, and cooperating to confine said compartment.

15. The armrest device as claimed in claim 14, wherein said rear segment of said upper shell part has a curved top wall and a pair of side walls that extend from opposite lateral edges of said curved top wall, one of said side walls being formed with said wall opening.

16. The armrest device as claimed in claim 11, wherein said press member is formed with an elongated through slot therethrough, said armrest device further comprising a pivot axle extending though said though slot to interconnect pivotally said first and second pivot connecting portions.

17. An armrest device comprising:
an armrest mount formed with a first pivot connecting portion, said first pivot connecting portion being formed with an arcuate slide slot that is configured with a latching notch;

an armrest member formed with a second pivot connecting portion that is pivoted to said first pivot connecting portion such that said armrest member is pivotable relative to said armrest mount; and a locking unit mounted operably in said pivot connecting portion, and including a press member that is accessible externally of said second pivot connecting portion, and a locking tab that projects from said press member and that extends into said slide slot in said first pivot connecting portion;

wherein said press member is operable to move from a locking position, where said locking tab extends into said latching notch to engage said first pivot connecting portion and arrest pivoting movement of said armrest member, to an unlocking position, where said locking tab is moved out of said latching notch so as to disengage said first pivot connecting portion and permit pivoting movement of said armrest relative to said armrest mount;

said slide slot having a front slot end and a rear slot end, and being configured with said latching notch adjacent to said front slot end, said armrest member being movable between a lowered position where said locking tab is engaged with said latching notch and a raised position where said locking tab is disengaged from said latching notch and moved along said slide slot until said locking tab abuts against said rear slot end of said slide slot.

\* \* \* \* \*